US011032726B2

(12) United States Patent
Kummetz et al.

(10) Patent No.: US 11,032,726 B2
(45) Date of Patent: Jun. 8, 2021

(54) OPTIMIZATION SYSTEM FOR DISTRIBUTED ANTENNA SYSTEM

(71) Applicant: Andrew Wireless Systems GMBH, Buchdorf (DE)

(72) Inventors: Thomas Kummetz, Kissing (DE); Matthew Thomas Melester, Mckinney, TX (US); Stefan Eisenwinter, Buchdorf (DE); Alfons Dussmann, Gansheim (DE); Markus Gerhard Kalt, Doettingen (CH); Marianna Fabbri, Faenza (IT)

(73) Assignee: Andrew Wireless Systems GmbH, Buchdorf (DE)

( * ) Notice: Subject to any disclaimer, the term of this patent is extended or adjusted under 35 U.S.C. 154(b) by 648 days.

(21) Appl. No.: 14/303,287

(22) Filed: Jun. 12, 2014

(65) Prior Publication Data

US 2014/0370884 A1     Dec. 18, 2014

Related U.S. Application Data

(60) Provisional application No. 61/834,175, filed on Jun. 12, 2013.

(51) Int. Cl.
*H04W 24/00*     (2009.01)
*H04W 24/10*     (2009.01)
(Continued)

(52) U.S. Cl.
CPC ............. *H04W 24/10* (2013.01); *H04B 7/155* (2013.01); *H04W 16/22* (2013.01)

(58) Field of Classification Search
CPC ..... H04W 24/06; H04W 24/08; H04W 24/10; H04W 16/22; H04W 36/32; H04W 84/18
See application file for complete search history.

(56) References Cited

U.S. PATENT DOCUMENTS 5,983,106 A * 11/1999 Bernardin ............. H04W 16/18
455/446
6,047,185 A    4/2000 Sanden
(Continued)

OTHER PUBLICATIONS

International Application No. PCT/IB2014/062186, International Search Report and Written Opinion dated Sep. 29, 2014, 11 pages.
(Continued)

*Primary Examiner* — Khalid W Shaheed
(74) *Attorney, Agent, or Firm* — Fogg & Powers LLC (57) ABSTRACT

A mobile testing system for optimizing wireless coverage in a distributed antenna system is disclosed. In some aspects, the mobile testing system includes a measurement receiver that can determine signal levels for a respective signals communicated via the distributed antenna system. A processing device of the mobile testing system can identify a subset of the signals by decoding a respective identifier encoded in each of the subset of signals. The identifiers specify that the subset of signals is targeted to at least one coverage zone in which the mobile testing system is located. A subset of signal levels is obtained by the measurement receiver that corresponds to each of the subset of signals. The processing device can generate coverage contour data based on the subset of signal levels that describes signal coverage for at least one coverage zone.

18 Claims, 5 Drawing Sheets

(51) Int. Cl.
*H04W 16/22* (2009.01)
*H04B 7/155* (2006.01)

(56) References Cited

U.S. PATENT DOCUMENTS

| | | | |
|---|---|---|---|
| 7,486,953 | B2 | 2/2009 | Robinson |
| 7,962,139 | B2 | 6/2011 | Kangude et al. |
| 8,060,077 | B2 | 11/2011 | De Pomian |
| 8,160,501 | B1* | 4/2012 | Hyde ............... H04B 7/15578 455/67.11 |
| 8,254,848 | B1* | 8/2012 | Elliott ................ H04B 7/022 370/242 |
| 8,275,363 | B2 | 9/2012 | Peng |
| 8,374,607 | B2 | 2/2013 | Hagerman et al. |
| 8,396,039 | B2 | 3/2013 | Pawar et al. |
| 8,498,207 | B2 | 7/2013 | Trigui et al. |
| 8,559,951 | B2 | 10/2013 | Chen |
| 8,565,689 | B1 | 10/2013 | Rubin et al. |
| 8,676,247 | B2 | 3/2014 | Ferris et al. |
| 2006/0285523 | A1 | 12/2006 | Ishii et al. |
| 2008/0096542 | A1 | 4/2008 | Chu et al. |
| 2010/0120371 | A1 | 5/2010 | Sato et al. |
| 2010/0120415 | A1 | 5/2010 | Urquhart et al. |
| 2010/0135178 | A1* | 6/2010 | Aggarwal ............ G01S 5/0205 370/252 |
| 2013/0017863 | A1 | 1/2013 | Kummetz et al. |
| 2013/0071112 | A1* | 3/2013 | Melester ............ H04W 52/24 398/38 |
| 2013/0114446 | A1 | 5/2013 | Liu et al. |
| 2014/0064247 | A1* | 3/2014 | Teyeb ............ H04W 36/0083 370/331 |

OTHER PUBLICATIONS

European Patent Office, "Communication Pursuant to Article 94(3) for EP Application No. 14738896.1", "Foreign Counterpart to U.S. Appl. No. 14/303,287", dated Mar. 1, 2018, pp. 1-4, Published in: EP.

European Patent Office, "Brief Communication Re Oral Proceedings Date/Time is Maintained from EP Application No. 14738896.1", from Foreign Counterpart to U.S. Appl. No. 14/303,287, dated Nov. 5, 2019, pp. 1-6, Published: EP—faxed in advance.

European Patent Office, "Result of Consulation from EP Application No. 14738896.1", from Foreign Counterpart to U.S. Appl. No. 14/303,287, dated Oct. 29, 2018, pp. 1-6, Published: US.

European Patent Office, "Extended European Search Report from EP Application No. 20170410.3 dated Aug. 12, 2020", From Foreign Counterpart of U.S. Appl. No. 14/303,287; pp. 1 through 9; Published in EP.

European Patent Office, "Summons to attend oral proceedings pursuant to Rule 115(1) from EP Application No. 14738896.1 dated May 3, 2019", from Foreign Counterpart to U.S. Appl. No. 14/303,287, pp. 1-8, Published: EP.

Trueman et al., "Validation of Computed Portable Radio Handset Near Fields by Measurement", Symposium on Antenna Technology and Applied Electromagnetics, 1996, pp. 1-11, IEEE.

Manoj, Kanagalu R., "Coverage estimation for mobile cellular networks from signal strength measurements", Dissertation, University of Texas at Dallas, Apr. 1999, 115 pages.

* cited by examiner

OPTIMIZATION SYSTEM FOR DISTRIBUTED ANTENNA SYSTEM

CROSS-REFERENCE TO RELATED APPLICATION

This claims priority to U.S. Provisional Application Ser. No. 61/834,175, filed Jun. 12, 2013 and titled "Optimization System for Distributed Antenna System," the contents of which are incorporated herein by reference.

BACKGROUND

Commissioning a distributed antenna system ("DAS") can include performing coverage testing in one or more coverage zones of a coverage area (e.g., a building, structure, or other geographic area) serviced by the DAS. Coverage testing can be performed to demonstrate that the DAS can satisfy a specific signal coverage requirement. Coverage testing can also be used to optimize the overlap between one coverage zone and another coverage zone.

Coverage testing may typically be performed manually. Coverage testing can include stimulating each coverage zone of the DAS or other telecommunication system with test signals and collecting signal measurements along test routes. Test routes can include a path within the coverage area of the DAS along which test signal measurements are collected. A user manually measures signal coverage for different coverage zones. For example, a user may walk through the coverage zone and use a measurement receiver to measure signal levels at different physical locations within the coverage zone. The signal measurements may be used to map coverage areas and handover areas.

The user may also have a portable computing device in communication with the measurement receiver, which displays a floor plan of the building serviced by the DAS. As the user walks through the coverage zone, the user may select a point on the floor plan by, for example, tapping a touch screen. Based on the inputs from the user to the screen, the selected portions of the floor plan may be correlated to the signal coverage measurements from the measurement receiver.

Measurements taken by the user may later be imported to a separate offline software tool to process the data to produce coverage contour data. The results can be manually analyzed to determine possible changes to the DAS to optimize coverage. Performing manual coverage testing and manual optimization of a DAS can be time consuming and labor intensive. The process of walking through a coverage zone with a portable measurement device to obtain signal measurements and manually associating the measurements with geographic locations can be increasingly disadvantageous as the size and complexity of a DAS increases.

Accordingly, it is desirable to reduce the time associated with performing coverage testing and optimizing a wireless DAS or other telecommunication system.

SUMMARY

According to one aspect, a mobile testing system is provided for optimizing wireless coverage in a distributed antenna system. The mobile testing system can include a measurement receiver and a processing device communicatively coupled to the measurement receiver. The measurement receiver can determine signal levels for signals communicated via the distributed antenna system. The processing device can identify a subset of signals from the signals. The subset of signals are identified by decoding an identifier encoded in each of the subset of signals. The identifiers specify that the subset of signals is targeted to at least one coverage zone in which the mobile testing system is located. A subset of signal levels is obtained from the signal levels by the measurement receiver. Each of the subset of signal levels corresponds to one of the subset of signals. Coverage contour data is generated describing signal coverage throughout the coverage zone. The coverage contour data is generated based on the subset of signal levels.

According to another aspect, an optimization system is provided for optimizing wireless coverage in a distributed antenna system. The optimization system can include a data transceiver in a unit of the distributed antenna system. The data transceiver can encode test signals with an identifier that identifies at least one coverage zone to which the test signals are to be transmitted. The data transceiver can provide the test signals to a remote unit of the distributed antenna system that is positioned in the coverage zone. The remote unit can transmit the test signals in the coverage zone. The optimization system can also include a mobile testing system positioned in the coverage zone. The mobile testing system can determine signal levels for the signals, includes the test signals. The mobile testing system can identify the test signals by decoding the identifiers from the test signals and generate coverage contour data describing signal coverage throughout the at least one coverage zone. The coverage contour data can be generated based on the signal levels.

According to another aspect, a method is provided. The method can include transmitting uplink signals a mobile testing system to at least one remote unit in communication with the mobile testing system. The method further can include the mobile testing system monitoring a gain and an uplink spectrum of the remote unit during transmission of the uplink signals and identifying a variation in the gain or the uplink spectrum. Coverage contour data can be generated that describes the variation in the gain or the uplink spectrum.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Systems and methods are disclosed for an optimization system that can be used for optimizing wireless coverage provided by a distributed antenna system ("DAS") or other telecommunication system. Optimizing wireless coverage can include providing an acceptable signal level in coverage zones of the DAS. Optimizing wireless coverage can also include positioning handover zones in the DAS such that the number of simultaneously occurring handovers in the DAS is minimized.

The optimization system can include a data transceiver located in at least one unit of the DAS (such as, but not limited to, a master unit, a base station router, a remote unit, etc.) and a mobile testing system or other mobile measurement platform. The data transceiver can encode test signals with identifiers that identify a coverage zone to which the test signals are to be transmitted. The data transceiver can provide the test signals to a remote unit of the DAS that is located in the coverage zone identified by the test signal identifier. The remote unit can transmit the test signals in the coverage zone. Signal levels for the test signals can be measured by the mobile testing system located in the coverage zone.

In some aspects, the optimization system can generate a unique test signal for each coverage zone of a building, structure, or other geographical area serviced by the DAS. A unique identifier can also be generated for each coverage zone and can be included in the test signal. For example, each test signal can be modulated with the identifier data. Modulating the test signal with the identifier data can include modulating a test signal with a frequency shift corresponding to the identifier data or modulating the amplitude of the test signal in a manner corresponding to the identifier data. A component of the mobile testing system can decode the identifier data and generate acknowledgement messages indicating that the information was received or processed.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Figure 1:
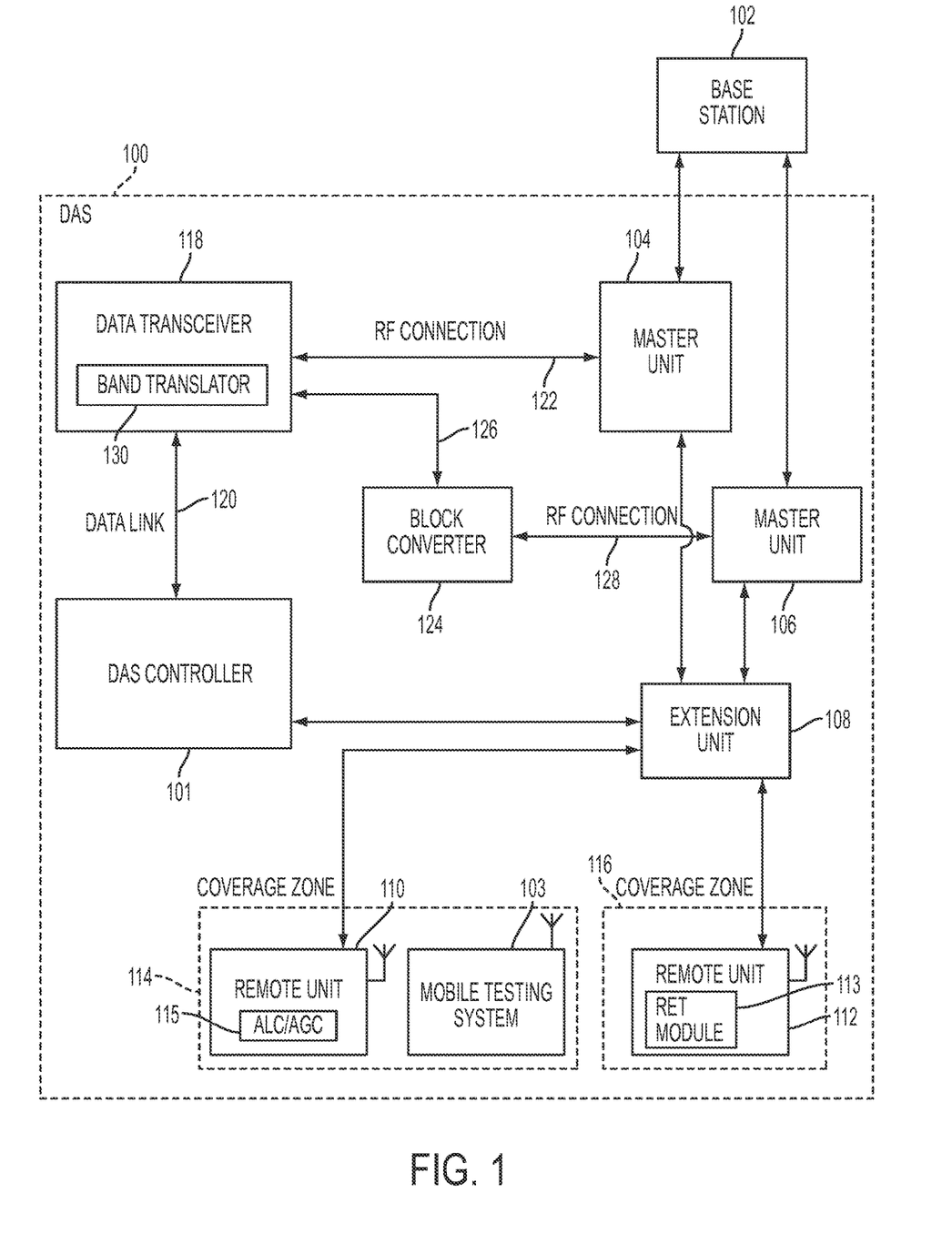
FIG. 1 is a block diagram depicting an example of a distributed antenna system including a data transceiver that can operate as a test signal generator and receiver according to an aspect of the present disclosure.

FIG. 1 is a block diagram of a DAS 100 suitable for generating coverage contour data for optimizing wireless coverage. The DAS 100 depicted in FIG. 1 includes a data transceiver 118 that can operate as a test signal generator and receiver according to embodiments of the subject matter described herein. As shown, the DAS 100 can also include a network of spatially separated remote units 110, 112 connected to a common signal source via a transport medium that provides wireless service within a geographic area or structure, such as a building. The DAS 100 can communicate signals between a base station 102 and terminal devices (not shown) via, for example, master units 104 and 106, extension unit 108, and remote units 110, 112.

The DAS 100 can include master units 104, 106 for receiving uplink signals and downlink signals from the base station 102. Any suitable communication link can be used for communication between base station 102 and the master units 104, 106, such as (but not limited to) a direct connection or a wireless connection. A direct connection can include, for example, a connection via a copper, optical fiber, or other suitable communication medium. In some aspects, the master units 104, 106 can be connected to the remote units 110, 112 via extension unit 108.

Remote units 110, 112 can provide signal coverage in coverage zones 114 and 116, respectively, by transmitting downlink signals to terminal devices and receiving uplink signals from the terminal devices in the coverage zones 114,116. The remote units 110, 112 can transmit uplink signals to the master units 104, 106 or other unit. The master units 104, 106 can combine uplink signals received from the remote units 110, 112 for transmission to the base station 102.

The DAS controller 101 can communicate with any unit in the DAS 100, including the data transceiver 118, via any suitable data link 120. A non-limiting example of the data transceiver 118 includes a digital signal generator and measurement receiver ("DSMR"). In some aspects, the data transceiver 118 can communicate signals directly with the master unit 104 via a radio frequency ("RF") connection 122. In other aspects, the data transceiver 118 can communicate signals with a master unit 106 via a block converter 124. The data transceiver 118 can be communicatively coupled to the block converter 124 via connection 126. The block converter 124 can be communicatively coupled to the master unit 106 via RF connection 128. The block converter 124 can convert signals from the data transceiver 118 into signals at designated frequencies for which signal coverage can be measured.

Figure 2:
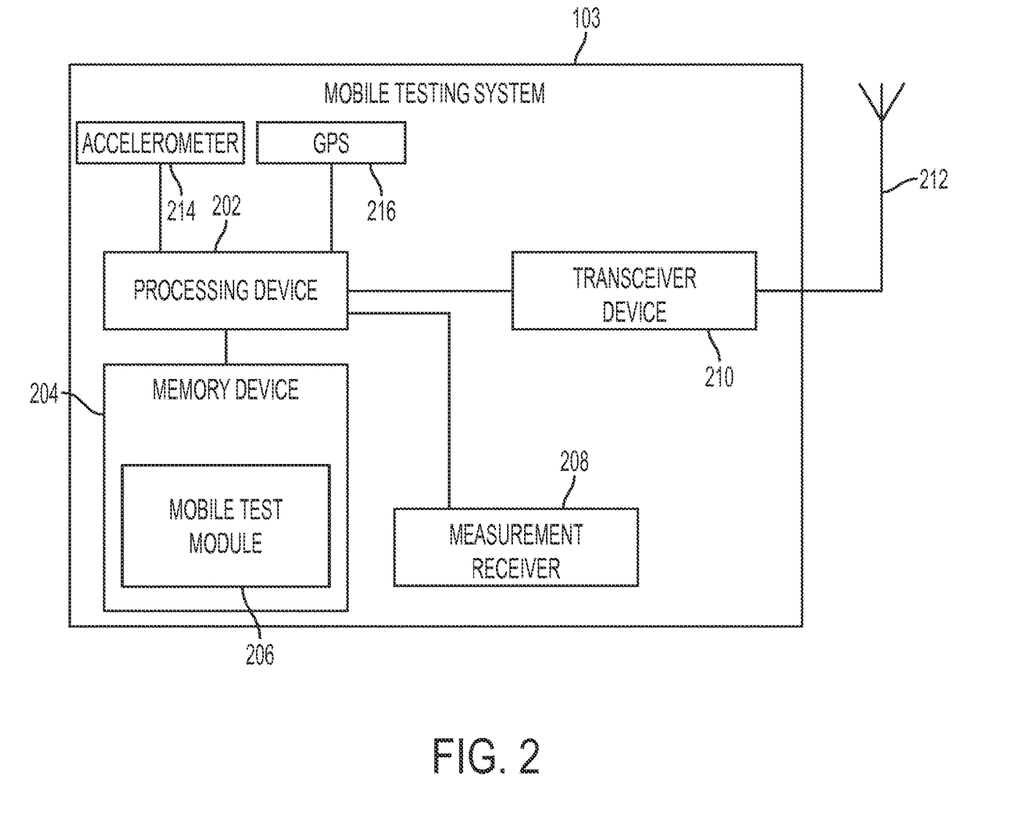
FIG. 2 is a block diagram depicting an example of a mobile testing system that can be used for optimizing a distributed antenna system according to an aspect of the present disclosure.

The data transceiver 118 can generate a downlink signal that can be provided to specific coverage zones in the DAS 100. In some aspects, the data transceiver 118 can be integrated into a unit of the DAS 100. For example, the data transceiver 118 can be integrated with the master unit 104 or 106, a base station router (not shown), a remote unit 110 or 212, or any other suitable unit in the DAS 100. In other aspects, the data transceiver 118 can include a standalone device in communication with one or more units of the DAS 100, as depicted in FIG. 2.

In some aspects, the data transceiver 118 can be implemented using a common data format transceiver. The common data format transceiver can provide mobile communication signals such as global system for mobile communications ("GSM") signals, wideband code division multiple access ("WCDMA") signals, universal mobile telecommunications system ("UMTS") signals, or long-term evolution ("LTE") signals from a femtocell base station. The operating frequencies can be the frequencies on the DAS 100 or other telecommunication system. In some aspects, the common data format transceiver can be integrated into the mobile testing system 103. For example, computing devices such as smart phones and tablet computers may already include an integrated data transceiver which can be used for performing the methods described herein.

In some aspects, test signals provided by the data transceiver 118 can be compliant with communication standards such as (but not limited to) Wi-Fi, ZigBee, Bluetooth, etc. Standards such as Wi-Fi, ZigBee, Bluetooth, etc. can operate in industrial, scientific, and medical ("ISM") bands such as 2.4 GHz or 868 MHz (ZigBee in the European Union) or 915 MHz (ZigBee in the United States or Australia).

In additional or alternative aspects, test signals compliant with some communications standards may be unsuitable for use in the DAS 100. A band translator 130 may be connected to the output of the data transceiver 118 to translate the frequency of the data format associated with the data transceiver 118 to a band that is usable by the DAS 100. The band translator 130 of the DAS controller 101 can translate a "transmit" signal of the data transceiver 118 to a downlink frequency band. Similarly, the band translator 130 of the DAS controller 101 can translate a "receive signal" of the data transceiver 118 from an uplink frequency band to a receive band of the data transceiver 118. The band translator 130 can translate received signals into one frequency band of the DAS 100 or multiple bands at the same time. For example, the band translator 130 can be used in downlink to convert a test signal that is compliant with a long term evolution (LTE) communication standard to a different frequency. The signal can then be transported to a remote unit. At the remote unit, the signal can be converted back to the original frequency before the signal is transmitted to a coverage zone. In the uplink direction, the band translator 130 can convert a frequency shifted signal to the signal's original frequency in order to comply with, for example, the LTE communication standard.

FIG. 2 is an example of the mobile testing system 103 that can be used for optimizing a DAS according to an aspect of the present disclosure. The mobile testing system 103 can include a processing device 202 in communication with a memory device 204, a mobile test module 206 stored in the memory device 204, a measurement receiver 208, a transceiver device 210, and an antenna 212. Instructions can be stored in the memory device 204 as executable code. The instructions can include processor-specific instructions generated by a compiler and/or an interpreter from code written in any suitable computer-programming language. The instructions can include the mobile test module 206. The mobile test module 206 can execute processes for optimizing the DAS based on signal level measurements obtained from the measurement receiver 208. The transceiver device 210 can communicate with other devices in the DAS and/or control units external to the DAS. For example, uplink measurements can be transmitted to the mobile testing system 103 in real time or near real time via the transceiver device 210 such that carrier-to-interference ratio information can be displayed at the mobile testing system 103.

The measurement receiver 208 can determine signal levels for signals in the coverage area, including the test signals provided by the transceiver device 210. The processing device 202 can identify the test signals by decoding identifiers encoded in the test signals by other units of the DAS 100. The processing device 202 can obtain the test signal levels from the measurement receiver 208. The processing device 202 can execute the mobile test module 206 to generate coverage contour data based on the test signal levels obtained from the measurement receiver 208. The coverage contour data can include data that describes signal coverage throughout the coverage zone, such as signal strength provided by the DAS 100 for different physical locations within coverage zones. In some aspects, the processing device 202 can execute the mobile test module 206 to identify test signals transmitted in an overlapping coverage area and determine handover contour data for an overlapping region of the coverage areas. The handover contour data can describe signal coverage throughout the overlapping region.

The mobile testing system 103 can collect and display coverage contour data or handover contour data for coverage zones in real time or near real time. Collecting and displaying coverage contour data and handover contour data for coverage zones in real time can include, for example, defining or otherwise identifying an interval of time and collecting and displaying the coverage data within the time interval. Displaying the coverage contour data and handover contour data in real time can allow for remote units 110, 112 to be configured which coverage testing is performed.

The contour coverage data and/or handover contour data can be analyzed to determine the relative signal strengths in different coverage areas. Remote units 110, 112 of the DAS 100 can be physically reconfigured based on the coverage data. In some aspects, physically reconfiguring a remote unit 110, 112 can include modifying the orientation of one or more antennas (i.e., the "antenna tilt") of the remote unit 110, 112. In additional or alternative aspects, physically reconfiguring a remote unit 110, 112 can include modifying a beamformer pattern of the remote unit 110, 112. The coverage testing process can be repeated with the modified configuration of the remote units 110, 112.

Configuring a remote unit 110, 112 can include adjusting an output power of the remote unit 110, 112, modifying an antenna tilt for the remote unit 110, 112, and the like. In some aspects, an antenna tilt can be modified manually by a user physically changing the antenna tilt by hand. In other aspects, the remote unit 112 may include a remote electrical tilt ("RET") module 113 that allows the antenna tilt to be modified by remote actuators and position sensors. The RET module 113 for the remote unit can be controlled based on coverage contour data collected by a measurement receiver 208. For example, the mobile testing system 103 can execute the mobile test module 206 to generate control information describing a configuration or change in the configuration of the remote unit. The control information can be transmitted with a control signal to the remote unit 112 via a DAS controller 101, a master unit 106 or 110, or a direct link with the remote unit. The remote unit can be automatically configured based on the control information.

In additional or alternative aspects, the mobile testing system 103 can correlate measured signals levels with positions on a floor plan or other schematic depicting or otherwise describing the coverage area serviced by the DAS 100. For example, the correlation between measured signal levels and locations in the coverage area can be performed in response to a user input received via an input device of the mobile testing system 103. For example, the mobile testing system 103 can include a touch screen. Tapping or providing another input to the touch screen can cause the processing device 202 to mark the corresponding position on the floor plan.

In other aspects, the correlation between measured signal levels and locations in the coverage area can be performed automatically by the mobile testing system 103 without user input to an input device. In one example, the mobile testing system 103 can include an accelerometer 214. The mobile testing system 103 can automatically determine the physical location of the user within the building or structure serviced by the DAS based on movement detected by the accelerometer 214. The mobile testing system 103 can correlate the measured data with a corresponding position on a floor plan without an input from the user identifying the user's location. Automatically determining the physical location of the user can reduce the need for a user to provide input identifying the physical location at which measurements are collected. The user can have the option to reset the location by manually marking the correct location. In another example, the mobile testing system can include a global position system ("GPS") device 216 that can identify a given location of the mobile testing system 103 at a given time. The processing device 202 can correlate locations at designated times with signal levels measured at the designated times.

In additional or alternative aspects, the mobile testing system 103 can simultaneously measure signals levels and decode multiple signals in multiple bands. For example, the measurement receiver 208 can collect measurements for multiple signals having unique frequencies and determine the coverage contour data and handover areas for multiple coverage zones. The mobile testing system 103 can determine the coverage contour data by identifying dominant signals that associated with a given sector. Dominant signals can include signals having measured signal levels above a predefined threshold signal level. The mobile testing system 103 can determine handover areas by comparing the dominant signals to other signals.

In some aspects, the data collected by the measurement receiver 208 can be used for tuning a propagation model. The propagation model can include a characterization of radio wave propagation as a function of frequency, distance, or other conditions. The propagation model can be tuned to reduce the number of test routes. Predictions of the signal levels can be compared to actual measurements of the signal levels and a corresponding prediction confidence metric can be generated. For example, data collected by the measurement receiver 208 can be compared with predicted data produced by a simulation software program. The simulation software program can use a propagation model (e.g. ITU indoor propagation). By comparing measurement receiver 208 data with predicted data produced by the simulation software program, differences can be identified in terms of frequency, distance, or other conditions. Identifying these differences can allow for adapting the propagation model in the simulation software. In one aspect, the propagation model in the simulation software can be adapted manually in order to match the measured and simulated data. In an alternative aspect, the propagation model can be automatically adapted by a software algorithm. By adapting the propagation model in the simulation software to match measured and simulated data, simulations can better approximate the measured data and the number of test routes can be reduced as a result.

In additional or alternative aspects, the mobile testing system 103 can transmit a unique test signal in the uplink band. The unique test signal in the uplink band can be transmitted simultaneously or non-simultaneously with a test signal in the downlink band. For example, the measurement receiver 208 of the mobile testing system 103 can be configured to transmit uplink signals that can be received by remote units 110, 112 in the coverage zone. The uplink test signals can be modulated with data that identifies a location marker or a time stamp associated with the mobile testing system 103. The uplink test signal can also be modulated to include commands for adjusting or otherwise configuring an antenna tilt or remote output power setting of a remote unit 110, 112. The uplink test signal can also be modulated with data that provides position information for the uplink coverage contour data. A positive acknowledgement message that the command has been received and implemented can be transmitted by the remote unit 110, 112. In some aspects, the acknowledgement message can be transmitted along with a subsequent downlink test signal.

In additional or alternative aspects, the measurement receiver 208 can measure and decode a signal transmitted by the mobile testing system 103 to generate uplink coverage data. Uplink coverage data can be computed in a similar manner as described above with respect to the downlink coverage data. One or more remote units 110, 112 can be configured based on the uplink coverage data. In some aspects, signal measurements can be isolated on a coverage zone-by-coverage zone basis to determine overlapping coverage between areas located coverage zones.

In additional or alternative aspects, the mobile testing system 103 can determine maximum signal levels for uplink signals and reduce or prevent the generation of intermodulation products in the DAS 100. For example, the mobile testing system 103 can be configured to transmit uplink test signals that can be received by remote units 110, 112 of the DAS 100. The mobile testing system 103 can monitor modifications to the gain of the remote unit 110 or 112 in response to the mobile testing system 103 transmitting uplink test signals. Examples of modifications to the gain of the remote units 110, 112 can include modifications performed by an automatic level control ("ALC") or automatic gain control ("AGC") device 115 of associated with remote unit 110 or 112. The ALC or AGC device 115 can modify the gain of the remote unit 110 or 112 unit in response to uplink signal levels exceeding a threshold signal level. The DAS 100 can then determine any intermodulation products generated by the ALC or AGC device 115 as a result of modifying the gain of the remote unit 110 or 112. The ALC or AGC device 115 can be configured to reduce or eliminate any intermodulation products.

In some aspects, the mobile testing system 103 can optimize wireless coverage in a DAS 100 by communicating with a DAS controller 101 via the remote units 110, 112. The mobile testing system 103 can use the transceiver device 210 of the mobile testing system 103 to transmit signals having frequencies in an uplink frequency band. The mobile testing system 103 can monitor a gain and an uplink spectrum of a given remote unit 110 or 112 while the transceiver device 210 is active. Variations in gain generated by an ALC or AGC device 115, intermodulation products, or spurious emissions by the remote units 110, 112 can be included in coverage contour data. In some aspects, an automated optimization process can be implemented by the DAS controller 101 to optimize uplink gain distribution. The optimization can performed be based on the measured variations in gain.

Figure 3:
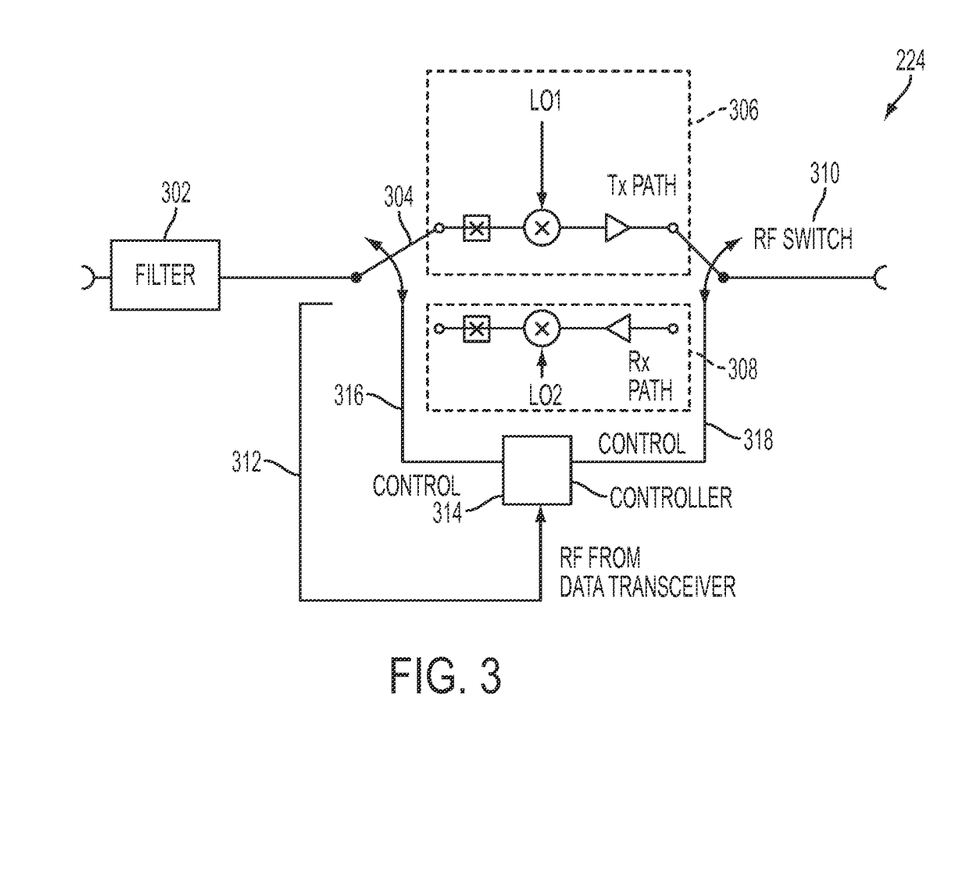
FIG. 3 is a circuit diagram depicting an example of a block converter according to an aspect of the present disclosure.

FIG. 3 is a circuit diagram of an example of a block converter 124 for communicating signals between a data transceiver 118 and a master unit 106 according to an aspect of the present disclosure. The block converter 124 can be operatively coupled to the integrated data transceiver 118. The block converter 124 can receive a signal at filter 302. The signal can be filtered by filter 302. The block converter 124 can be switched from a receive mode 308 to a transmit mode 306 by RF switches 304 and 310. The RF switches 304 and 310 can be configured based on an RF detector 314. The RF detector 314 can trigger the change from the receive mode 308 to the transmit mode 306 in response to detecting power from the data transceiver 118 via connection 312. The block converter 124 shown in FIG. 3 is shown to be operating in the transmit mode 306, as indicated by the position of RF switches 304 and 310. RF switches 304 and 310 may be connected to control paths 316 and 318 for communicating control signals between the RF detector 314 and the input and output of the block converter 124.

In some aspects, an accelerometer 214 can be used to automatically determine a physical location of the mobile testing system 103 in the coverage zone. For example, a user can identify an initial location of the mobile testing system by using an input device to select a position depicted in a floor plan or other schematic of a coverage area. The accelerometer 214 can determine a direction in which the user is moving and a velocity at which the user is moving. The processing device 202 can determine a path of movement of the mobile testing system 103 from the direction and velocity. In additional or alternative aspects, a GPS device 216 can be included in the mobile testing system 103. The mobile test module 206 can determine an absolute position of the user based on location data from the GPS device 216. In additional or alternative aspects, a user position can be determined by the user inputting the position into the mobile testing system 103 position via any suitable input device (e.g., a mouse or a touch screen). In additional or alternative aspects, a user position can be determined by trilateration. For example, the mobile test module 206 can determine a distance to data transceivers 118 having positions corresponding to known positions of remote units 110, 112 of the DAS 100. In two-dimensional geometry, if a point lies on two circles the locations of the centers of the circles and their radii are known, the location of the point can be narrowed to two possible locations. Additional information can be used to further narrow the possible location for the point (e.g., down to one unique location). The mobile test module 206 can determine the distance to the data transceivers 118 using received signal strength indicators ("RSSI") or time difference of arrival at the mobile testing system 103.

In additional or alternative aspects, the mobile testing system 103 can use movement gestures of the mobile testing system 103 to control and input information into the mobile test module 206. In one non-limiting example, moving the mobile testing system 103 up and down X times can indicate that the mobile testing system 103 is in the vicinity of a unit identified as "Antenna X." In another non-limiting example, moving the mobile testing system 103 in a fanning movement can indicate that the mobile testing system 103 is located in a handover zone. In another non-limiting example, tilting the mobile testing system 103 at a given tilt angle can indicate that the mobile testing system 103 is located at a given position in the coverage area of the DAS 100.

In additional or alternative aspects, a sector matrix of the DAS 100 or the DAS controller 101 can generate unique signals for each coverage zone. In some aspects, unique signals for each coverage zone can be generated by having the data transceiver 118 generate individual beacon settings for each sector and transmit the test signal using the individual beacon settings, one by one, for each of the sectors in a predetermined sequence. In some aspects, unique signals for each zone can be generated by having a different or separate data transceiver for each sector provide a respective test signal using individual beacon settings for the sector.

Figure 4:
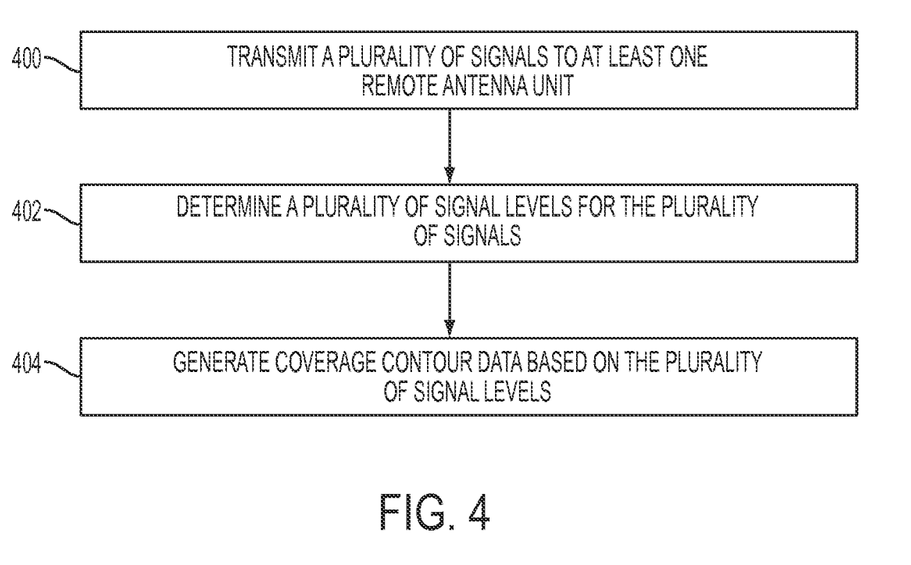
FIG. 4 is a flow chart depicting an example of a process for optimizing a distributed antenna system according to an aspect of the present disclosure.

FIG. 4 is a flow chart of an example of a process for optimizing a distributed antenna system according to an aspect of the present disclosure.

In block 400, uplink signals can be transmitted to at least one remote unit 110, 112. For example, a data transceiver 118 can be disposed in at least one unit of the DAS 100. The data transceiver 118 can be configured to encode test signals with an identifier. Each identifier can identify a coverage zone to which the test signals are to be transmitted. The data transceiver 118 can provide the test signals to a remote unit 110, 112 of the DAS 100 that is located in the coverage zone 114, 216. The remote unit 110, 112 can be configured to transmit the test signals in the coverage zone 114, 216.

In block 402, signal levels can be determined for signals. For example, a processing device 202 which is communicatively coupled to the measurement receiver 208 can be configured to decode a respective identifier, which is encoded the test signal, from each of test signals. The processing device 202 can identify the test signals based on the identifiers. Test signal levels can be obtained from the signal levels. Each of the test signal levels can correspond to one of the test signals. According to one aspect, the mobile testing system 103 can monitor a gain and an uplink spectrum of the remote unit 110, 112 during transmission of the uplink signals. A variation in at least one of the gain and the uplink spectrum associated with the remote unit 110, 112 can be identified by the mobile testing system 103.

In block 404, coverage contour data can be generated by the mobile testing system 103 based on the test signal levels. The coverage contour data can describe signal coverage throughout the coverage zone(s). In some aspects, the coverage contour data can also describe the variation in the gain or the uplink spectrum of the remote units 110, 112 in the DAS 100.

In additional or alternative aspects, a coverage plan for the building or structure serviced by the DAS 100 can be uploaded in the form of a digital file (e.g., an image file) to the DAS controller 101 and the mobile testing system 103. Uploading the coverage plan can facilitate the determination of position of the mobile testing system 103 The coverage plan can be used to identify walls, hurdles, and other obstacles. The mobile test module 206 can determine potentials paths that may be taken by a user to move through the building or structure for coverage testing (e.g., paths walked by a user or by a vehicle driven by the user).

Figure 5:
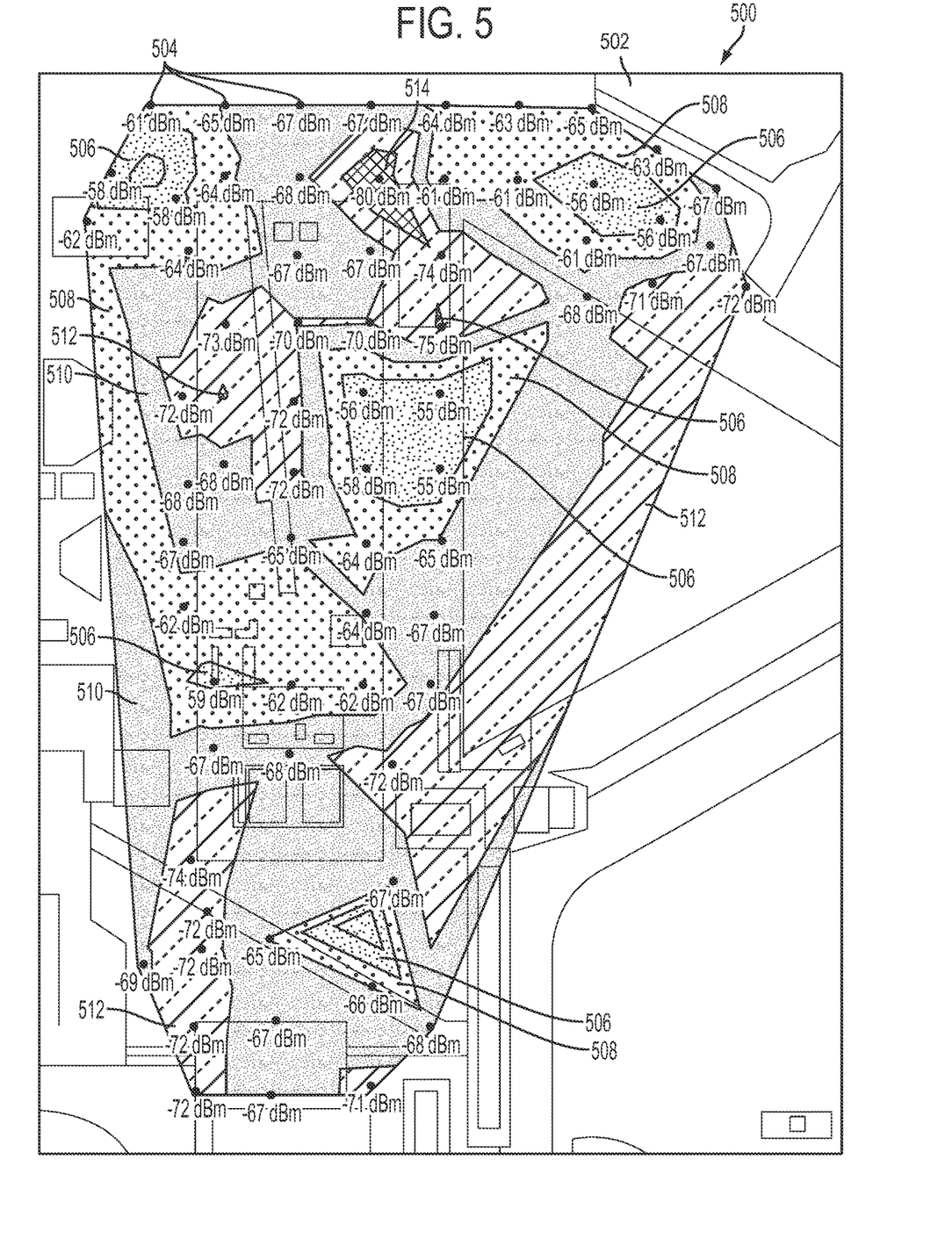
FIG. 5 is diagram depicting an example of a screen display showing coverage contour data according to an aspect of the present disclosure.

FIG. 5 is an example of a screen display showing coverage contour data 500 according to an aspect of the present disclosure. The coverage contour data 500 can be associated with building floor plans 502 or other geographical information. For example, a floor plan 502 can represent walls and points of interest of a building and surrounding area. The coverage contour data 500 can include data describing signal coverage throughout the coverage zones served by the DAS. As described above, signals can be communicated via the DAS to stimulate the coverage zones. Subsets of the signals can each be encoded with an identifier that specifies a coverage zone to which the subset of signals is targeted. Each of the subsets of signals can be identified by decoding the respective identifier encoded in each of the subsets of signals. Signal levels can be obtained for each of the subsets of signals. The coverage contour data 500 can be generated based on the subset of signal levels.

The coverage contour data 500 can also describe signal coverage throughout an overlapping area of a first coverage zone and an additional coverage zone. The coverage contour data 500 can be generated based on the subset of signal levels associated with the first coverage zone and an additional subset of signal levels associated with the additional coverage zone. For example, the coverage contour data 500 can include measurement locations 504. The measurement locations 504 can include signal level measurements obtained by the measurement receiver. The measurement locations 504 can include a grid or other regular pattern. Additionally or alternatively, the measurement locations 504 can be more densely located along heavily trafficked areas (e.g., hallways or conference rooms) or overlapping areas between coverage zones.

The coverage contour data 500 can be divided into multiple signal level bands. Each signal level band can include a range of signal levels that are grouped based on predetermined criteria. For example, the signal level band 506 can be associated with the strongest signal level or highest performance. The signal level band 506 can be colored in bright green or otherwise indicated using a suitable visual representation of the coverage contour data 500. Similarly, signal level band 508 can include a strong signal level associated with good performance and can be colored light green or otherwise visually indicated. Signal level band 510 can include an acceptable signal level associated with average performance and can be colored yellow or otherwise visually indicated. Signal level band 512 can include a poor signal level associated with slow performance and can be colored orange or otherwise visually indicated. Signal level band 514 can include an undetectable signal level associated with unacceptable performance and can be colored red or otherwise visually indicated.

The foregoing description of aspects and features of the disclosure, including illustrated examples, has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each disclosed example can be combined with any other example. The illustrative examples described above are given to introduce the reader to the general subject matter discussed here and are not intended to limit the scope of the disclosed concepts.

The invention claimed is:

1. A mobile testing system for optimizing wireless coverage in a distributed antenna system, the mobile testing system comprising:
   a measurement receiver configured to determine a plurality of signal levels for a plurality of signals received by the measurement receiver after being wirelessly communicated from the distributed antenna system; and
   processing circuitry communicatively coupled to the measurement receiver and configured to:
      identify a subset of signals from the plurality of signals by decoding a respective identifier encoded in each of the subset of signals, wherein the respective identifier identifies that the subset of signals is targeted to at least one coverage zone in which the mobile testing system is located,
      obtain, from the measurement receiver, a subset of signal levels from the plurality of signal levels, wherein the subset of signal levels corresponds to the subset of signals,
      generate coverage contour data describing signal coverage throughout the at least one coverage zone, wherein the coverage contour data is generated based on the subset of signal levels,
      determine at least one modification to at least one remote unit of the distributed antenna system based on the coverage contour data,
      generate control information specifying the at least one modification, wherein the control information comprises at least one control signal, and
      modify at least one of an antenna orientation and a beamforming pattern of the at least one remote unit by causing the at least one control signal to be transmitted to the at least one remote unit.

2. The mobile testing system of claim 1, wherein the processing circuitry is further configured to generate the coverage contour data by:
   determining a plurality of locations within the at least one coverage zone at which the subset of signals are determined by the measurement receiver;
   correlating each of the plurality of locations to the subset of signal levels; and
   generating the coverage contour data based on correlating the plurality of locations and the subset of signal levels.

3. The mobile testing system of claim 2, further comprising an accelerometer communicatively coupled to the processing circuitry and configured to determine a direction of movement and a velocity of movement of the mobile testing system,
   wherein the processing circuitry is further configured to determine the plurality of locations based on the direction of movement and the velocity of movement determined by the accelerometer.

4. The mobile testing system of claim 2, further comprising a global navigation satellite system receiver communicatively coupled to the processing circuitry and configured to generate location data identifying the plurality of locations of the mobile testing system,
   wherein the processing circuitry is further configured to receive the location data and to determine the plurality of locations from the location data.

5. The mobile testing system of claim 2, further comprising an input circuitry communicatively coupled to the processing circuitry and configured to receive input data identifying a plurality of positions on a map of the at least one coverage zone;
   wherein the processing circuitry is configured to determine the plurality of locations based on the input data identifying the plurality of positions on the map.

6. The mobile testing system of claim 1, wherein the processing circuitry is further configured to:
   identify an additional subset of signals from the plurality of signals by decoding a respective additional identifier encoded in each of the additional subset of signals, wherein the respective additional identifier identifies that the additional subset of signals is targeted to at least one additional coverage zone overlapping the at least one coverage zone;
   obtain, from the measurement receiver, an additional subset of signal levels from the plurality of signal levels, wherein the additional subset of signal levels corresponds to a respective one of the additional subset of signals; and
   generate handover contour data describing signal coverage throughout an overlapping area of the at least one coverage zone and the at least one additional coverage zone, wherein the coverage contour data is generated based on the subset of signal levels and the additional subset of signal levels.

7. The mobile testing system of claim 1, wherein the at least one modification comprises at least one of:
   a modification to an output power of the at least one remote unit;
   a modification to a pattern of a beamformer for the at least one remote unit; and
   a modification to an antenna tilt of the at least one remote unit.

8. The mobile testing system of claim 1, further comprising a transceiver circuitry configured to communicate with other telecommunication devices via the distributed antenna system.

9. The mobile testing system of claim 1, wherein the processing circuitry is configured to:
   identify a time interval, wherein the coverage contour data is generated during the time interval; and
   display the coverage contour data in real time for the time interval.

10. An optimization system for optimizing wireless coverage in a distributed antenna system, the optimization system comprising:
   a data transceiver disposed in at least one unit of the distributed antenna system, wherein the data transceiver is configured to:

encode each of a plurality of test signals with a respective identifier, wherein each identifier identifies at least one coverage zone to which the plurality of test signals is to be transmitted; and provide the plurality of test signals to at least one remote unit of the distributed antenna system that is positioned in the at least one coverage zone, wherein the at least one remote unit is configured to wirelessly transmit the plurality of test signals in the at least one coverage zone; and a mobile testing system, comprising processing circuitry, positioned in the at least one coverage zone, the processing circuitry configured to:

determine a plurality of signal levels for a plurality of signals received by the mobile testing system after being wirelessly transmitted from the distributed antenna system, wherein the plurality of signals includes the plurality of test signals;

identify the plurality of test signals based on decoding identifiers from the plurality of test signals;

generate coverage contour data, describing signal coverage throughout the at least one coverage zone, wherein the coverage contour data is generated based on the plurality of signal levels;

determine at least one modification to the at least one remote unit of the distributed antenna system based on the coverage contour data;

generate control information specifying the at least one modification, wherein the control information comprises at least one control signal; and modify at least one of an antenna orientation and a beamforming pattern of the at least one remote unit by causing the at least one control signal to be transmitted to the at least one remote unit.

11. A method comprising:

wirelessly receiving, at a mobile testing system, a plurality of signals associated with a respective identifier transmitted via a distributed antenna system;

determining, by a mobile testing system, a plurality of signal levels for the plurality of signals received by the mobile testing system;

identifying, by the mobile testing system, a subset of signals from the plurality of signals by decoding the respective identifier encoded in each of the subset of signals, wherein the respective identifier identifies that the subset of signals is targeted to at least one coverage zone in which the mobile testing system is located;

obtaining, by the mobile testing system, a subset of signal levels from the plurality of signal levels, wherein the subset of signal levels corresponds to the subset of signals;

generating coverage contour data describing signal coverage throughout the at least one coverage zone, wherein the coverage contour data is generated based on the subset of signal levels;

determining at least one modification to at least one remote unit of the distributed antenna system based on the coverage contour data;

generating control information specifying the at least one modification, wherein the control information comprises at least one control signal; and modifying at least one of an antenna orientation and a beamforming pattern of the at least one remote unit by causing the at least one control signal to be transmitted to the at least one remote unit.

12. The method of claim 11, further comprising:

transmitting, by the mobile testing system in communication with at least one remote unit of a distributed antenna system, a plurality of uplink signals to the at least one remote unit;

monitoring a gain and an uplink spectrum of the at least one remote unit during the transmitting of the plurality of uplink signals;

identifying a variation in at least one of the gain and the uplink spectrum by the at least one remote unit; and generating coverage contour data describing the variation in the at least one of the gain and the uplink spectrum.

13. The method of claim 11, further comprising:

identifying, by the mobile testing system, an additional subset of signals from the plurality of signals by decoding a respective additional identifier encoded in each of the additional subset of signals, wherein additional identifiers specify that the additional subset of signals is targeted to at least one additional coverage zone overlapping the at least one coverage zone;

obtaining, by the mobile testing system, an additional subset of signal levels from the plurality of signal levels, wherein the additional subset of signal levels corresponds to a respective one of the additional subset of signals; and generating handover contour data describing signal coverage throughout an overlapping area of the at least one coverage zone and the at least one additional coverage zone, wherein the coverage contour data is generated based on the subset of signal levels and the additional subset of signal levels.

14. The method of claim 11, further comprising:

modulating a test signal using at least one of identifier data, a frequency shift, or an amplitude of the test signal;

decoding identifier data in the test signal; and generating an acknowledgement message in response to receiving the test signal and successfully decoding the identifier data.

15. The method of claim 11, further comprising adjusting a propagation model based on a characterization of radio wave propagation as a function of frequency or distance, where the propagation model is associated with the distributed antenna system and is adjusted to reduce a number of test routes associated with locations at which a gain and an uplink spectrum are monitored.

16. The method of claim 11, further comprising comparing a prediction of the signal levels to signal level measurements and generating a prediction confidence metric based on the comparison.

17. The method of claim 11, wherein generating coverage contour data further comprises:

identifying a time interval, wherein the coverage contour data is generated during the time interval; and displaying the coverage contour data in real time for the time interval.

18. The method of claim 11, wherein the at least one modification comprises at least one of:

a modification to an output power of the at least one remote unit;

a modification to a pattern of a beamformer for the at least one remote unit; and a modification to an antenna tilt of the at least one remote unit.

* * * * *